United States Patent [19]

Kranz

[11] 4,311,373
[45] Jan. 19, 1982

[54] PHOTOGRAPHIC CAMERA WITH DRIVING AND STOPPING MECHANISM

[75] Inventor: Gerhard Kranz, Brunswick, Fed. Rep. of Germany

[73] Assignee: Rollei-Werke Franke & Heidecke GmbH & Co. KG, Brunswick, Fed. Rep. of Germany

[21] Appl. No.: 190,614

[22] Filed: Sep. 25, 1980

[30] Foreign Application Priority Data

Oct. 1, 1979 [DE] Fed. Rep. of Germany ....... 2939770

[51] Int. Cl.³ ............................ G03B 7/08; G03B 9/02
[52] U.S. Cl. ......................................... 354/43; 354/42; 354/46; 354/270; 354/271
[58] Field of Search ................... 354/40, 41, 42, 43, 354/46, 270, 271

[56] References Cited

U.S. PATENT DOCUMENTS

| | | | |
|---|---|---|---|
| 1,974,433 | 9/1934 | Riszdorfer | 354/43 |
| 3,518,930 | 7/1970 | Thiene et al. | 354/43 |
| 3,611,892 | 10/1971 | Ort et al. | 354/42 |
| 3,868,702 | 2/1975 | Strauss et al. | 354/42 |

Primary Examiner—Russell E. Adams
Attorney, Agent, or Firm—Staas & Halsey

[57] ABSTRACT

A photographic camera with a driving mechanism for setting of the diaphragm of the camera lens, typically an interchangeable lens unit, having a stopping device which stops the driving mechanism, wherein the focusing error resulting from the inertia of the moving parts are eliminated or reduced to an insignificant value. An armature plate is movably mounted at the side of a stop band opposite magnet poles of an electromagnet of the stopping device, with the stop band between the magnet poles and the plate, the movement of the armature being substantially crosswise to the direction of motion of the stop band. The stop band was very small dimensions, being preferably reduced to a size limited by its mechanical strength. The stop band is directly and fixedly connected to the driving mechanism and the plate bears with a small initial stress against the stop band.

20 Claims, 11 Drawing Figures

PHOTOGRAPHIC CAMERA WITH DRIVING AND STOPPING MECHANISM

BACKGROUND OF THE INVENTION

1. Field of the Invention

The invention relates to a photographic camera with means for reducing the focussing error resulting from setting the diaphragm.

2. Description of the Prior Art

In a known camera of this type, as described in West German Disclosure Publication No. 22 57 608.5, the stopping element takes the shape of a brake disk of ferromagnetic material resting on a flexible shaft, along the periphery of which the magnet poles of the electromagnet are arranged with a small opening for the shaft. A pinion is rigidly connected with the brake disk and meshes with a spur rack which, in turn, is placed on the driving element formed as an axially moving actuating rod. The electromagnet is controlled by the exposure meter and receives an exciting current impulse when the diaphragm has reached the position corresponding to the prevailing object brightness, that is to say, the light passing through the remaining lens aperture results in an exact exposure of the photographic image. The magnetic field resulting at the magnet poles during the magnetic induction is closed over the brake disk. The latter is attracted by the flexible shaft and stopped mechanically against the pole areas of the electromagnet. The rotating brake disk thus constitutes the armature of the electromagnet and forms part of the magnetic circuit.

Considerable focusing errors occur in such a stopping device, that is to say, deviations of the actual diaphragm position from the desired diaphragm position at the instant when the stop signal was fed to the electromagnet. These focusing errors are mainly due to the large mass of the brake disk which cannot be stopped instantaneously but only with a definite time lag. The mass of the brake disk, however, can only be minimized to a limited extent because the magnetic flux of the electromagnet, being closed over the brake disk, requires a brake disk with adequate thickness. Furthermore, tolerances between the spur rack and the driving pinion for the brake disk contribute to the lag or the focusing error.

SUMMARY OF THE INVENTION

An object of the invention is to provide a device of the kind mentioned above, in which diaphragm setting errors, due to mechanical or electromechanical errors connected with the operation of the diaphragm control device, are considerably reduced or almost completely eliminated.

In the camera provided by the invention, the stopping element has a minimum mass with an adequately low inertia without deleteriously affecting the magnetic core of the electromagnet. The stopping element can be stopped instantaneously, without any time lag. An overshooting of the stop band, as is observed in the brake disk of known construction as discussed above, does not occur.

Due to the direct and rigid coupling of the stopping element with the driving member, even driving members with a comparatively large mass can be stopped rapidly and promptly. Here, too, an overshooting of the diaphragm past the desired lens aperture is avoided with a high degree of certainty.

An advantageous feature of an embodiment of the invention is that the armature plate is spaced a distance from the pole areas, which spacing is solely determined by the very thin stopping element. In this way, the electromagnet has practically no working stroke and, consequently, the device has an extremely short reaction time. The construction of the stopping element as a thin stop band results in a simple structure of the stopping device, enabling the driving member to be created with minimum mass.

Another embodiment of the invention has the low-mass stop band drawn tight at all times by a stretching element, so that the mass of the moving parts do not influence the stopping procedure. Also, a driving member with comparatively little inert mass can be used which can be stopped by the stop band rapidly and promptly without overshooting.

The stopping device has the considerable advantage that it is compatible with various types of lens-aperture characteristics, depending upon the construction of the lenses, and particularly with various types of interchangeable lenses. Tests with interchangeable lenses of different types and brands in which the lens aperture is adjusted by means of a diaphragm control which moves parallel to the axis of in the lens have shown that in each the function of the lens aperture has a different behavior dependent upon the path of the aperture control. It is also observed that the diaphragm control is not driven at an arbitrary speed, but that the space-time function of the diaphragm control generally has a definite chracteristic behavior, because otherwise the lens aperture and diaphragm control would no longer agree exactly with one another. For example, the lens aperture may have a slight delay in relation to the diaphragm control path. The stopping device should, for example, abruptly stop the driving member and, thereby the diaphragm control, when the desired lens aperture has been obtained. However, since the diaphragm leaves forming the lens aperture might not bear exactly against the diaphragm control, and due to their velocity, have a certain delay in relation thereto, or because they might recoil after the diaphragm control has been stopped, therefore the lens aperture may be too large or too small in relation to the desired lens aperture. Adjusting errors also occur. Through appropriate design of the driving and stopping device provided by the present invention, a specific desired velocity control of the driving member and, thereby, of the diaphragm control can be obtained for all interchangeable lenses. Advantageously, after a starting phase, this velocity is initially very great and diminishes along the path of the diaphragm control. In the present invention any component with a large mass can be made to act on the stop band on the other side of the electromagnet from the diaphragm control, so that any influence of this large mass on the stopping of the driving mechanism is eliminated. Thus, the advantageous action of the novel stopping and driving device for the aperture stop is not deleteriously affected by the retarding device.

One embodiment of the invention is characterized in that the spring or restraining element for stretching the stop band is formed as a leaf spring which is fixed to the free end of a rocking lever and the stop band passes through an opening in the rocking lever and is held at the free end of the spring leaf. As a result, the required mounting space in the camera for the driving and stopping mechanisms can be reduced to a minimum.

Another embodiment of the invention is characterized in that the stopping element has several stop bands which are oriented parallel to each other with a predetermined spacing from one another with flux conducting elements of soft magnetic material placed between the stop bands in the area of the magnet poles. As a result, great braking force can be obtained for the same applied potential of the exciting coil of the electromagnet.

In another embodiment of the invention the stop bands are connected together via at least one mechanical differential gear constructed as a stationary roller and held against the driving and/or stretching element, thus ensuring uniform tension of all the stop bands.

In another embodiment of the invention, a mechanical power booster is provided to increase the magnetic force of the electromagnet. With the slightest excitation of the electromagnet, self-locking of the stopping element sets in due to a jamming of the armature plate with the magnet poles. This leads to a considerable reduction in the force required of the electromagnet, resulting in minimum energy requirements and in a longer life of the camera battery.

According to another embodiment of the invention, such a power booster is realized by hinging the armature plate on a fixed, pivotally mounted supporting lever which is inclined toward the direction of movement of the stop band. The angle and the initial stress with which the armature plate bears against the stop band are adjusted so that when the electromagnet is in the non-excited state the device is just at the point where there is no self-locking between the pole areas of the electromagnet and the armature plate.

In another embodiment of the invention, such a power booster is realized by providing the electromagnet with a cylindrical slotted yoke having pole areas which lie opposite one another in the yoke slot, placing the stop band around the yoke in the form of a loop, preferably at a loop angle greater than 360°, and causing the armature plate, located along the periphery of the yoke at a position covering the yoke slot, to rest on the part of the stop band which runs up on the yoke. Self-locking of the stop band will occur even if the mechanical power booster is constructed as a loop mechanism, because at the instant of magnetic induction the armature plate resting with a slight bearing pressure on the yoke is mechanically and instantaneously pressed on the yoke by the movement of the stop band.

For shortening the braking time the exciting coil is provided with a winding tap and a circuit arrangement is provided which, upon the appearance of a stop signal for the electromagnet, briefly applies the full direct voltage to the part of the exciting coil tapped via the winding tap. As a result of this measure according to the invention, a rapid excitation of the electromagnet is achieved which also reduces to a considerable extent the reaction time of the stopping device provided by the invention.

According to another embodiment of the invention, such a rapid excitation of the electromagnet can be achieved by connecting the power supply to the exciting coil in series with a transistor, connecting the base of the transistor, preferably via a resistance, to the stop signal input, and providing the circuit arrangement with a diode inserted between the exciting coil and the transistor, with a second transistor connected in parallel with the series arrangement of the residual exciting coil, diode and first transistor, and connecting the base of the second transistor to the stop signal via an RC element. The residual exciting coil is understood to mean that part of the exciting coil which is not tapped by the winding tap, in this case the part lying between the winding tap and the output of the exciting coil.

In another embodiment of the invention, the electromagnet is rapidly excited by connecting the exciting coil in series with a transistor to the power supply, connecting the base of the transistor, preferably via a resistance, to a stop signal input, and providing the circuit arrangement with a diode interposed between the exciting coil and transistor, and with a capacitor connected in parallel with the series arrangement of the residual exciting coil and diode. The stop signal input is usually coupled with the output of an automatic mechanism which generates an output signal, the so-called stop signal for the stopping device, as a function of the established exposure time, the established film sensitivity, the object brightness, and the actual lens aperture during the closing procedure of the diaphragm, as soon as the actual lens aperture agrees with the desired lens aperture.

For shortening the braking time, the stopping device may be used as an electromagnetic brake which regulates the movement of the driving element. Thus, it is possible to economize on the retarding device for obtaining a definite path-time characteristic of the driving element for the lens diaphragm and to use a known device such as an electromagnetic retarding device to control the speed of the driving element. This leads to a considerable saving of components, to reduction of production costs and to reducing the required mounting space for the diaphragm driving and stopping devices.

In another embodiment of the invention, a speed sensor is advantageously coupled with the driving element and a governor is connected to the speed sensor and to the exciting coil of the electromagnet, the governor determining the exciting current in the exciting coil in accordance with the desired driving movement of the driving element. As long as the speed of the driving element results in the desired characteristic of the diaphragm motion, no current will flow through the exciting coil of the electromagnet. When the driving speed of the driving element is greater than that required by the characteristic diaphragm motion, the governor causes an exciting current of appropriate strength to flow through the exciting coil, depending upon the deviation. Depending upon the excitation of the electromagnet, the armature plate will be attracted more or less strongly and the stop band is pulled with friction between the armature plate and the pole surfaces of the magnet poles, causing the stop band and, thereby, the driving element, to be slowed. By means of the governor, the stop band can be slowed such that the speed of the driving element agrees exactly with the required path-time of the closing or opening motion of the diaphragm.

In another embodiment of the invention, the speed sensor involves a light detector which scans the movement of a lug coupled with the driving element, which preferably connected to the stop band, and the governor has a differentiator and a voltage-current transformer, the output of which is connected to the exciting coil. Thus, at the output of the differentiator a speed-proportional voltage signal is obtained which is converted in the voltage-current transformer into an adequate exciting current for the electromagnet.

FIG. 1 shows a device having driving element 13 for the diaphragm control 12, in which the retarding device is a spring leaf 14 preloaded in the driving direction of the diaphragm control 12 indicated by arrow A. When the interchangeable lens 11 is screwed on, the leaf spring 14 is aligned directly along the diaphragm control 12, with the diaphragm being in its open position.

A stopping device 15 having an electromagnet 16 with magnet poles 17 and 18 acts on a stop band 19 coupled with the driving element 13. The stop band 19 moves past the magnet poles 17, 18 and can be stopped by exciting the two exciting coils 20, 21 of the electromagnet 16. To this end, there is movably arranged on the side of the stop band 19 facing away from the magnet poles 17, 18 an armature plate 22 which faces the magnet poles 17, 18, said armature plate bearing with initial stress against the stop band 19. As shown in FIG. 1, the armature plate 22 may simply be fastened to a fixedly mounted leaf spring 23, which is so constructed that the initial stress for the armature plate 22 is very small and the friction between armature plate 22 and stop band 19 on the one hand and the magnet poles 17, 18 and the stop band 19 on the other hand is also very small when the electromagnet is in the non-excited state. The stop band 19 is fixedly and directly connected to the driving element 13 and is so constructed that its size, shown substantially perpendicularly to the armature plate area, is very small and is preferably reduced to a size as limited by its mechanical strength.

In the embodiment shown in FIG. 1, the stop band 19 is a stretched, inelastic thin band 26 preferably consisting of a metallic material with ferromagnetic properties and held at one end against the driving element 13.

In another embodiment of the invention, the speed sensor supplies directly, without a differentiator in the governor, a speed-proportional signal, in which the proportionality factor is also a function of the path of the diaphragm control.

In still another embodiment of the invention, the speed sensor has a fixed coil in the field of which moves a flat or plunger-shaped permanent magnet that is coupled with the driving element and is preferably connected to the stop band, or some similar arrangement, so that a voltage proportional to the speed of the driving element is tapped at the coil and fed to the governor. The circuit is designed so that the proportionality factor is a function of the path of the diaphragm control. In this case, the governor need only have a voltage-current transformer to convert the speed-proportional voltage signal into an exciting current of specified strength for the exciting coil of the electromagnet.

Other features and advantages of the present invention are understood from the following description offered by way of non-limitative examples, and from the drawings.

DETAILED DESCRIPTION OF THE PREFERRED EMBODIMENTS

Figure 1:
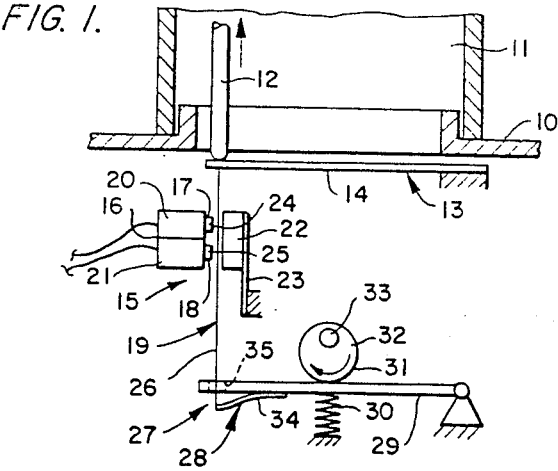
FIG. 1 is a side view of a driving element for the diaphragm with a stopping device.

A driving element 13 with a stopping device 15 is placed inside a camera housing 10, as shown in FIG. 1. An interchangeable lens unit 11 is screwed in a known manner onto the camera housing 10. A diaphragm control 12 adjusts the diaphragm in interchangeable lens unit 11. By means of this diaphragm control 12, the diaphragm opening or lens aperture can be switched from a closed to an open position or vice versa. The diaphragm control 12 and the lens aperture have a predetermined correspondence according to the lens construction.

A restraining or stretching element 27 acts on the other end of the stop band 26, holding it taught. Stretching element 27 has a spring element 28, which pulls the stop band 26 in the opposite direction as the driving leaf spring 14. Spring element 28 is attached to a rocking lever 29 which is preloaded in the driving direction of driving leaf spring 14. Under the tension of a pressure spring 30, which acts in the driving direction of driving leaf spring 14, rocking lever 29 bears against cam 31. The rotor 32 controls the speed of driving element 13 which operates automatically to control the speed of driving leaf spring 14, in accordance with a predetermined function, which produces an appropriate diaphragm aperture as required by the diaphragm mechanism of interchangeable lens 11. Usually, this diaphragm function is non-linear so that, after a starting phase, it is initially driven at a high speed which then increases in speed as the lens apertures become smaller. Such a non-linear path-time characteristic of the driving element 13 can be obtained with cam 31 of the rotor 32, said cam 31 rotating about an eccentric axis 33. On the side of rocking lever 29, which is on the opposite side from the driving leaf spring 14, spring element 28 for stretching the stop band 26 is affixed to rocking lever 29. Preferably, as shown, the spring element is constructed as a leaf spring 34, which is fastened with one end to rocking lever 29. It protrudes with its free end therefrom and holds stop band 26, which passes through an opening 35 in rocking lever 29.

Immediately before the diaphragm setting, the driving device and the stopping device 15 take the position shown in FIG. 1. When a diaphragm setting is initiated, cam 31 of rotor 32 will first rotate in the direction of the arrow. Due to its initial tension, driving leaf spring 14, which is connected via stop band 26 to rocking lever 29, pivots in the driving direction of diaphragm control 12, as shown by arrow A in FIG. 1. Thus, the diaphragm is adjusted and a diaphragm aperture in interchangeable lens 11 closes gradually. The driving speed of driving leaf spring 14 on diaphragm control 12 is controlled via stop band 26 and rocking lever 29 by cam 31 of the rotor 32. As soon as the desired lens aperture is attained, which is determined automatically from the predetermined exposure time, the established film sensitivity, and the prevailing object brightness, the automatic diaphragm mechanism sends a stop signal to electromagnet 16. Exciting coils 20, 21 of the electromagnet receive a direct current, and electromagnet 16 attracts aramture plate 22 with a comparatively great force, so that the stop band 26 is pressed by armature plate 22 against pole areas 24, 25 of magnet poles 17, 18. In this way, the stop band is stopped instantaneously without any time lag and instantaneously stops driving leaf spring 14. The movement of the diaphragm control 12 and, thereby, the opening or closing of the diaphragm, is completed at the instant when the automatic diaphragm mechanism generates the stop signal. Cam 31 of rotor 32 may rotate further regardless of the stopping of stop band 26. Owing to pressure spring 30, rocking lever 29 follows the movement of cam 31 and pivots further, however slightly, in the clockwise direction. Due to spring element 28, that is, the leaf spring 34, on rocking lever 29, the part of the stop band 26 which lies betwen electromagnet 16 and spring element 28 will continue to be held taught despite any further pivoting or motion of rocking lever 29.

Figure 2:
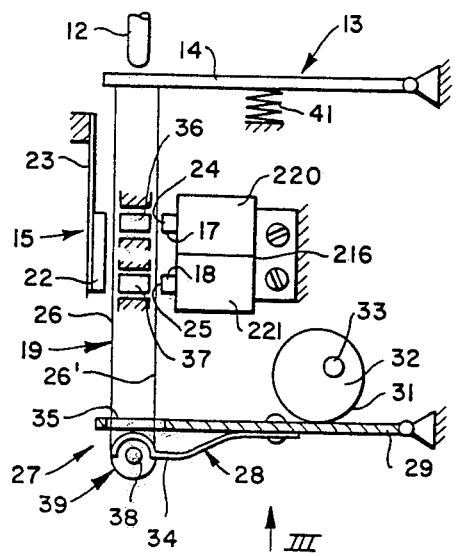
FIG. 2 is a side view of another driving element for the diaphragm with a stopping device.
Figure 3:
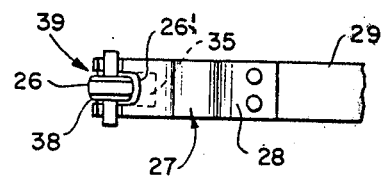
FIG. 3 is a view in the direction of arrow III of the driving element with the stopping device of FIG. 2.

The embodiment of driving device and stopping device shown in FIG. 2 differs from that of FIG. 1 by the stopping element 19 of stopping device 15 having a plurality, two as shown, of stop bands 26, 26' which are in a predetermined spaced relationship to one another parallel to pole areas 24, 25 of magnet poles 17, 18. Flux conduction pieces 36, 37 of soft magnetic material are placed between stop bands 26, 26' in the area of magnet poles 17, 18. In other respects, the driving and stopping devices of FIGS. 1 and 2 are similar so that respective components are indicated by the same reference numerals. In order to be able to hold both stop bands 26, 26' tightly drawn at all times, there is provided a mechanical differential gear 39 in the form of a stationary roll 38 placed against stretching element 28, showing a spring element. (See also FIG. 3). The mechanical differential gear 38 may likewise be attached to driving element 13. However, this is not the most appropriate, because it unnecessarily increases the moving mass to be stopped by stopping device 15. Driving element 12 in FIG. 2 takes the shape of a spring-loaded rocker 14 which is fixedly hinged in the housing and which is acted upon by a pressure spring 41 in the driving direction of diaphragm control 12. The action of this driving device 14 with stopping device 15 is the same as described above in connection with FIG. 1. Due to the arrangement of stop bands 26, 26', the same total flux of exciting coil 20, 21 of electromagnet 16 leads to fairly great braking forces. Flux conduction pieces 36, 37 are placed in such a way that they can only move toward or away from pole areas 24, 25. Stop bands 26, 26' may also be multiplied by an appropriate mechanical differential gear 39 alternately placed on stretching element 28, as shown, or on driving element 13.

Figure 4:
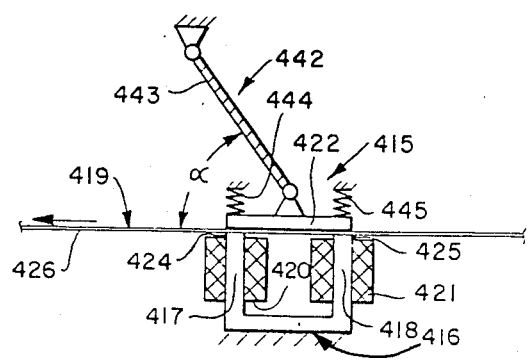
FIG. 4 is a side view of a stopping device in accordance with a third embodiment.
Figure 5:
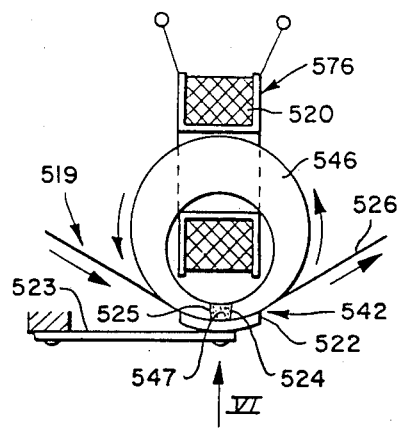
FIG. 5 is a side view of a stopping device in accordance with a fourth embodiment.
Figure 6:
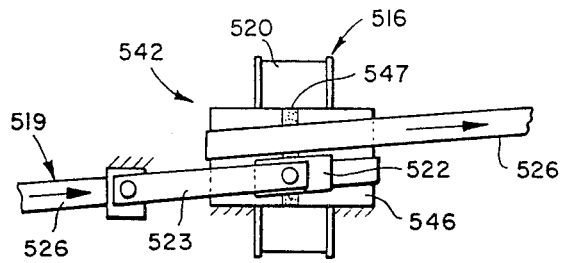
FIG. 6 is a plan view of the stopping device in the direction of arrow VI in FIG. 5.

In the stopping devices illustrated in FIGS. 4-6, the stopping devices are provided with a mechanical power booster. These power boosters act in the same direction as the magnetic force of the electromagnet, so that in the end the size of the electromagnet can be reduced, thereby decreasing the power requirements and economizing on the camera battery. The components of the stopping device shown in FIGS. 4 and 5 which correspond to like components in FIG. 1 are provided with corresponding reference numerals increased by 400 and 500, respectively.

Power booster 442 in FIG. 4 is formed by hinging the armature plate 422 of stopping device 415 on a fixed pivot supporting lever 443. Two pressure springs 444, 445 urge armature plate 422 to contact with proper pressure against stopping element 419, which likewise may take the shape of a stop band 426, and the latter, in turn, engages pole areas 424, 425 of magnet poles 417, 418. Supporting lever 443 is inclined at an angle $\gamma$ from the direction of movement of the horizontal stop band 426 as shown by the arrow. Angle $\gamma$ and the initial tension of pressure springs 444, 445 are established in such a way that when electromagnet 426 is in the non-excited state, there is no self-locking when stop band 426 moves between pole areas 424, 425 of magnet poles 417, 418 and armature plate 422. Locking occurs when magnet 416 is excited, be it ever so lightly, causing stop band 426 to stop.

Another embodiment as shown in FIGS. 5 and 6 includes power booster 542 with electromagnet 516 and a cylindrical slotted yoke 546 with pole areas 524 and 525 which face one another across yoke slot 547. Stop band 526 is placed around yoke 546 in the form of a loop, preferably at a loop angle which is greater than 15°. Armature plate 522, which conforms to the yoke curvature, rests on the periphery of yoke 546, covering yoke slot 547, in between which stop band 526 slides on the yoke. Armature plate 522, in turn, is placed by means of a leaf spring 523 under a slight initial tension on stop band 526 which can be wound around yoke 547 as shown in FIG. 6. In this case, exciting coil 520 surrounds both yoke 546 and stop band 526. The bearing pressure of armature plate 522 on stop band 526 and, thereby, on yoke 546, and the loop angle of the stop band are chosen such that when electromagnet 526 is in the non-excited state, self-locking is just avoided. To increase the mechanical stability, yoke slot 547 may be filled with a material which is not magnetically conducting. Also, for uniformity of the magnetic field lines, the upper half of yoke 547 in FIG. 6 not covered by armature plate 522 may consist of a material which is not magnetically conducting.

To shorten the excitation time of the electromagnet, that is to say, to accelerate its response, provision may be made in the stopping devices described above for rapid excitation of the respective electromagnet. Such rapid excitation will be described below in conjunction with stopping device 19 of FIG. 1. However, it is also applicable to the other stopping devices employed in the embodiments shown in FIGS. 2 to 5.

Figure 7:
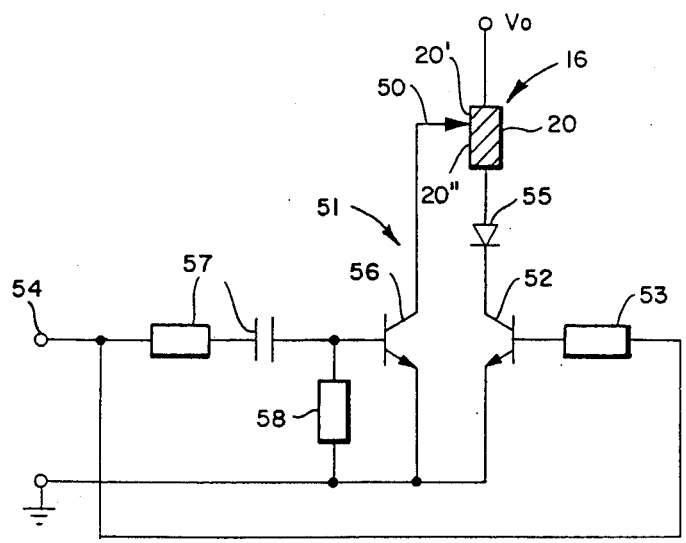
FIG. 7 is a wiring diagram of a switching arrangement for the electromagnet in the stopping device shown in FIGS. 1–6.
Figure 8:
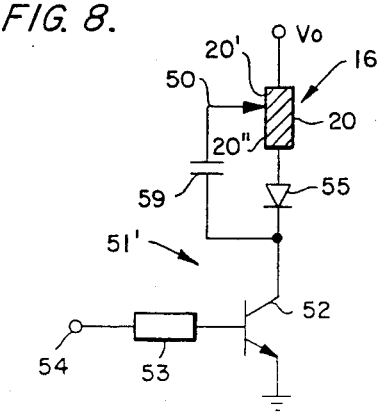
FIG. 8 is a wiring diagram of a second embodiment of a switching arrangement for the electromagnet of the stopping device in FIGS. 1–5.

The wiring diagram for such a switching arrangement for rapid excitation is shown in the two embodiments of FIGS. 7 and 8. In both cases, electromagnet 16 has an exciting coil 20 which may be connected to a power source with a prespecified direct voltage $V_o$. Exciting coil 20 has a winding tap 50, by means of which a part 20' of exciting coil 20 can be tapped. With this winding tap is connected a switching arrangement 51 (FIG. 7) or 51' (FIG. 8) which, upon the appearance of a stop signal for electromagnet 16 at terminal 54, briefly applies the full direct voltage to the part 20' of exciting coil 20 tapped via winding tap 50. To connect exciting coil 20 to the power supply, a transistor 52 is arranged in series with the exciting coil. The base of transistor 52 is connected via resistor 53 to the stop signal input 54, which is usually connected to the output of the automatic diaphragm mechanism at which appears a stop signal at the instant when, in the course of the diaphragm setting, the actual lens aperture agrees with the desired lens aperture. Both switching arrangements 51 and 51' have a diode 55 which is interposed between exciting coil 20 and transistor 52, that is to say, the anode of diode 55 is connected to exciting coil 20 and the cathode is connected to transistor 52.

The switching arrangement 51 shown in FIG. 7 has a second transistor 56, which is connected in parallel with a series arrangement of a residual exciting coil 20" (the part of exciting coil 20 which is not tapped by winding tap 50), diode 55, and first transistor 52. The base of the second transistor 56 is connected to the stop signal input 54 via an RC element 57. A resistor 58 is connected in parallel with the base-emitter junction of second transistor 56. On the other hand, in the switching arrangement 51' of FIG. 8, a capacitor 59 is connected in parallel with the series arrangement of residual exciting coil 20" and diode 55.

If in the circuit of FIG. 7 a stop impulse is applied to stop signal input 54 in the form of a voltage step, the second transistor 56 is briefly switched on via RC element 57. A current impulse flows through the tapped part 20' of exciting coil 20 and through second transistor 56. This current impulse generates in residual exciting coil 20" a voltage peak which is directed in such a way that diode 55 decouples exciting coil 20 and first transistor 52. Not until said voltage peak decays is the first transistor 52, at the base of which appears the voltage step, rendered conductive and transistor 52 takes over the coil current, while transistor 56 is turned off. This energization of exciting coil 20 via winding tap 50 to generate a voltage peak has, with respect to the excitation time of electromagnet 16, the same effect as the external application of an equally high voltage peak to the total coil. This results in a considerable increase in potential in the switching-on phase of the electromagnet. With a DC supply voltage of about 4 volts, a voltage peak of about 60 volts can be obtained in residual exciting coil 20".

In the circuit shown in FIG. 8, a stop signal is similarly applied to the stop signal input 54 in the form of a voltage step, thereby enabling transistor 52. At the instant when transistor 52 is switched on, there flows through capacitor 59, which initially acts as a short circuit, and through tapped part 20' of exciting coil 20 a current impulse which generates in residual exciting coil 20" a voltage peak directed in such a way that diode 55 is turned off, thereby decoupling residual exciting coil 20" of capacitor 59 and transistor 52. With increasing charging of capacitor 59, the voltage peak in residual exciting coil 20" decays and exciting coil 20 is connected to the full direct voltage of the power supply. In order to obtain an adequate large current impulse, the capacitance of capacitor 59 is appropriately sized. Thus, the decay time of the current flowing through capacitor 59 is comparatively large and, on balance, the circuit is not as advantageous as the circuit of FIG. 7.

Figure 9:
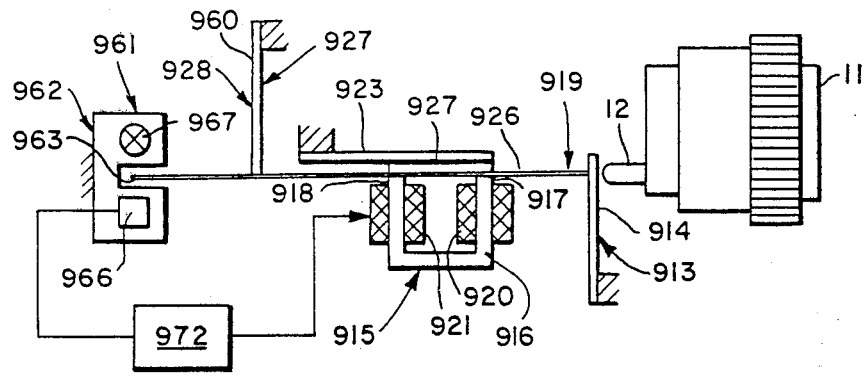
FIG. 9 is a side view of a driving element with a stopping device in accordance with a fifth embodiment.

In the embodiment of a driving device with stopping device 915 as shown in FIG. 9, the parts corresponding to those of the embodiment of FIG. 1 are indicated by like reference numerals increased by 900. The driving device has driving element 913 and the stopping device 915. Here the stopping device is also utilized as an electromagnetic brake controlling the driving motion of driving element 913. Selective control of the diaphragm opening and closing speed can be made with this electromagnetic brake, as discussed earlier, and the rotor 32 described with reference to FIG. 1 may be dispensed with. Its function can now be performed by stopping device 915. Also in stopping device 915, stopping element 919 is formed as a stop band 926 which at one end is fastened to driving element 913 formed as a leaf spring 914 and at the other end to stretching element 927. Here, stretching element 927 is a simple leaf spring 960 which is preloaded in a direction opposite to the driving direction of driving element 913. Coupled with driving element 913 is a speed sensor 961 which, in the embodiment of FIG. 9, has a light monitor 962. Coupled with speed sensor 961 and exciting coils 920, 921 is a governor 972 which determines the magnitude of the exciting current in exciting coils 920, 921 in accordance with the desired driving motion of driving element 913. Light monitor 962 in FIG. 9 scans a lug 963, which is rigidly connected to stop band 926 or to stretching element 927.

Figure 10:
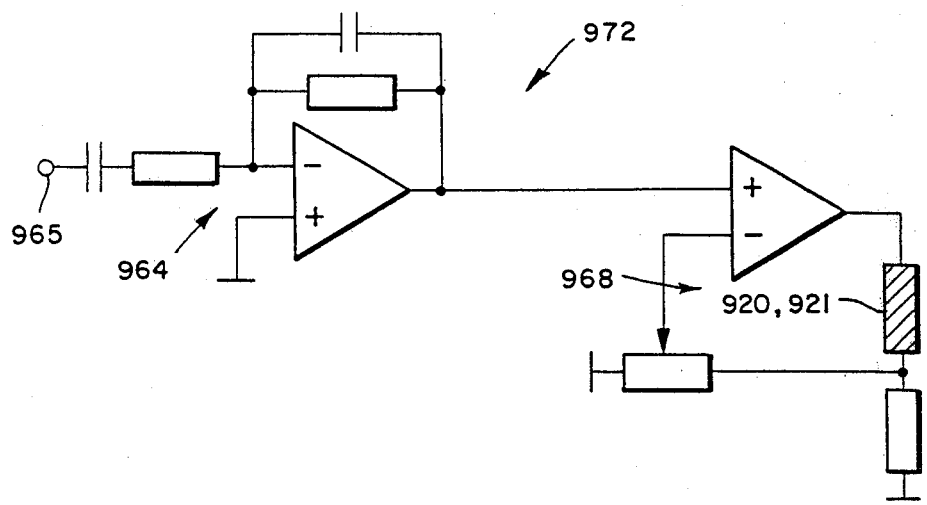
FIG. 10 is a wiring diagram of a governor in the driving element shown in FIG. 9.

Governor 972, whose circuit construction is shown in FIG. 10, has a differentiator 964, to whose input 965 is connected the output of photodetector 966 of light monitor 962. As is customary in a light monitor, photodetector 966 is illuminated by a light source 967, the luminous flux being modulated by lug 963. The differentiator 964 converts the signal generated by photodetector 966 into a speed-proportional voltage signal. This voltage signal is routed to the voltage-current transformer 968 connected to the output of differentiator 964. This transformer 968 converts the voltage signal into an appropriate exciting current for exciting coils 920, 921 which are connected to the output of voltage-current transformer 968. In the course of a diaphragm setting, lug 963 moves at the same speed as driving element 913, which initially moves freely under the action of driving element 913 and stretching element 927. At the output of differentiator 964 there appears a voltage signal whose strength is proportional to the increase or decrease of the modulated luminous flux. As a result of this voltage signal there flows in exciting windings 920, 921 an appropriately dimensioned exciting current which strengthens the slight bearing pressure exerted on stop band 926 by leaf spring 921 over armature plate 922 and causes stop band 926, which slides through between armature plate 922 and magnet poles 917, 918, to be braked. Depending upon the intensity of the exciting current, stop band 926 is braked more or less strongly without being stopped. The locking of stop band 926 occurs in the same manner as described in FIG. 1 upon the appearance of the stop signal generated by the automatic exposure unit. By appropriately shaping the light transmission of lug 963, the desired variations in speed of the diaphragm motion can be obtained.

Figure 11:
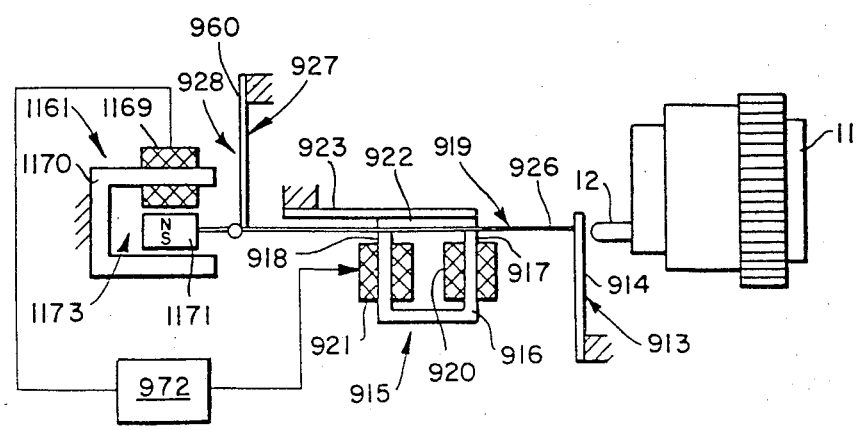
FIG. 11 is a side view of a driving element with a stopping device in accordance with a sixth embodiment.

The embodiment in FIG. 11 corresponds substantially to that of FIG. 9 with like parts again being indicated by like reference numerals. The driving device with driving element 913 bearing against diaphragm control 12 of interchangeable lens 11 and stopping device 915 with stop band 926 and stretching element 927 in the form of a leaf spring 960 are identical to those of FIG. 9. Here, too, stopping device 915 is also utilized as an electromagnetic control of the driving motion of driving element 913. Unlike the embodiment of FIG. 9, speed sensor 1161 has a flat or plunger-type coil system 1173 having a stationary coil 1169 with open yoke 1170. There is rigidly coupled with stop band 926 or stretching element 927 a permanent magnet 1171 which moves in the open yoke 1170 of flat or plunger-type system 1173 in accordance with the speed of driving element 1113. Preferably, the length of permanent magnet 1171 is the same as the depth of coil 1169. Coil 1169 is connected to governor 1172, whose output is connected to exciting coils 920 and 921 of electromagnet 916. Since coil 1169 supplies a speed-proportional voltage signal to governor 972, it is sufficient to provide the governor 972 with another voltage-current transformer to convert the speed-proportional voltage signal into an appropriate exciting current for exciting coils 920, 921. The permanent-magnetic circuit of speed sensor 1161 can now be formed in such a way that the proportionality factor between the speed of permanent magnet 1171 and the voltage delivered by coil 1168 is a function of the motion of the diaphragm control 12. Thus, stop band 926 can be stopped in the same fashion as described above to provide the diaphragm movement corresponding to interchangeable lens 11.

The invention is not limited to the embodiments described above, which may be modified in many ways without departing from the true spirit and scope of the invention. Thus, for example, the stop element (such as 19 of FIG. 1) may be designed as a hollow rod moving in the direction of the diaphragm control 12, the hollow rod being driven by a pressure spring placed in the interior thereof and the ends of said spring contacting one end of the hollow rod and the camera housing 10. Furthermore, in the mechanical power booster provided by the invention, which boosts the magnetic force of the electromagnet, wedge or pinch roll mechanisms may be utilized instead of the link or loop band mechanisms described above. Also, the speed sensor for using the stopping device as an electromagnetic sensor may, for example, take the form of a Hall probe or a magneto-resistance sensor.

In the embodiment shown in FIGS. 9 and 10, the formation of a speed-proportional signal by means of differentiator 964 may, for example, also be designed with if a direct comparison between the desired and the actual values of the path is carried out. To this end, a function defining the path as a function of time may be fed to governor 972 in FIG. 9. Instead of differentiator 964, governor 972 may have a comparator which compares the signal coming from photodetector 966 with the desired signal of the reference variable. As long as the distance traveled by the lug in the time unit agrees with the desired distance predetermined for the corresponding time unit, the comparator sends no signal to the voltage-current transformer 968. However, if the actual distance traveled by the lug, which the latter has covered starting out from the initial position, is greater, a braking current is generated in similar fashion for electromagnet 916.

Also, in the practical embodiment shown in FIG. 9, a digitally scanned line disk may be employed in the embodiment of FIG. 9 instead of the analog scanned lug 963. In this case, differentiator 964 is replaced by a frequency-analog transformer to generate a speed-proportional signal.

We claim:

1. A mechanism for a camera having a diaphragm control for an aperture that is typically located in an interchangeable lens unit and means for generating a stop signal when said aperture has a desired opening as a result of said diaphragm control, said mechanism comprising:
   a driving element for driving said diaphragm control,
   restraining means for restraining the rate of said driving of said diaphragm control by said driving element,
   a stop element connecting said driving means to said restraining means, and
   a stopping device acting on said stop element to stop said diaphragm control at the desired aperture opening on the occurrence of said stop signal, said stopping device comprising at least one electromagnetic coil and a magnet core at one side of said stop element and an armature plate at the other side of the said stop element, and means for applying said stop signal to activate said coil to brake to a stop by grasping said stop element between said core and plate.

2. The mechanism of claim 1, said driving element and at least the portion of said stop element on the driving element side of said stopping device having low inertial mass with respect to said restraining means.

3. The mechanism of claim 1,
   said driving means comprising a spring element that is rigidly fixed at one end and connected to said stop element at the other end,
   said stop element comprising a stop band,
   said restraining means comprising a rotating cam acting to displace a rigid member that is rotatably fixed at one end and operatively connected at the other end to said stop band, and
   said stopping device comprising said stop band passing between said magnet core and said armature plate, and said armature plate being connected to one end of a spring that is rigidly fixed at its other end, the relative positions of said magnet core, armature plate and stop band being such that said stopping device is close but not at the point of braking of said stop band before the application of said stop signal.

4. The device of claim 3, said restraining device comprising said rigid member having a spring attached near one end, the stop hand being connected to the other end of the spring, the configuration of said spring being such that said spring acts to pull said stop hand in the opposite direction than said driving element.

5. The device of claim 2,
   said stop element comprising two stop bands passing through said stopping device,
   said stopping device comprising flux conduction pieces located between said two stop bands, and said armature plate being located on one side of said stop bands and said magnet core being located on the other side of said stop bands in a relative configuration such that when said stop signal is applied said armature plate, flux conduction pieces and magnet core brake said stop bands, and
   said restraining means comprising a roller located at the end of a spring that is rigidly connected at its other end to the end of a rigid member that operates to restrain said stop bands by said stop bands passing over each side of said roller and being connected together at said roller.

6. The mechanism of claim 1, said stopping device comprising
   a magnet core having a circular configuration with a gap, an armature plate having a matching shape and located to move toward said magnet core over a portion of said gap, and said stop element comprising a stop band passing between said magnet core and said gap and said armature plate.

7. The mechanism of claim 6 comprising filling said gap with a non-magnetic material.

8. The mechanism of claim 6 or 7, said stop band looping at least at an angle of 15° around said circularly configured magnet core.

9. The mechanism of claim 1 comprising a power booster for mechanical advantage in the braking of said stop element.

10. The mechanism of claim 3 or 5 comprising a power booster for mechanical advantage in the braking of said stop element, said power booster comprising a straight member rotatably connected at one end to said armature plate and rotatably fixed at the other end, the angle between the motion of each said stop band and the straight member being less than ninety degrees, said angle being determined so that when said stop signal activates said stopping device the motion of each said stop band acts to provide said mechanical advantage to rapidly stop each said stop band.

11. The mechanism of claim 1, said stop element comprising plural stopping bands, and said stopping device comprising said armature plate being located at one side of said stop bands, said magnet core being located at the other side of said stop bands, and flux conduction pieces located between each adjacent pair of said stop bands, in a configuration such that said armature plate and flux conduction pieces move transversely to the direction of motion of said stop bands when said stop signal activates said stopping device.

12. The mechanism of claim 1, 3, 5, 6, 9, or 11 comprising said electromagnetic coil having a winding tap for dividing said coil into a tapped part and a residual exciting part of said coil, and switching means for initially activating only said tapped part of said coil upon the application of said stop signal to said stopping device and for subsequently activating both said parts of said coil.

13. The mechanism of claim 12 said coil being connected at one end to a power source of predetermined positive voltage and at the other end to the anode of a diode, the cathode of said diode being connected to the drain of a transistor having its source connected to ground and its base connected through a resistor to said stop signal.

14. The mechanism of claim 13, said switching mechanism comprising said winding tap being connected to the drain of another transistor having its source also connected to ground and its base connected through an RC element also to said stop signal.

15. The mechanism of claim 13, said switching mechanism comprising said winding tap being connected through a capacitor to the cathode of the diode.

16. The mechanism of claim 1, 3, 5, 6, 9, or 11, said restraining means comprising means for operating said stopping device to brake said stop element to produce a desired predetermined rate of speed of said driving of said diaphragm control prior to said application of said stop signal.

17. The mechanism of claim 16, said operating means comprising said stop element having a lug, a light monitor having a space in which said lug moves according to the motion of said stop element, said light monitor comprising means for determining the motion of said lug according to the amount of light of said monitor that is transmitted past said lug, and means for outputting a signal corresponding to said motion of said lug, and a governor for converting said output of said light monitor for outputting a control signal for controlling the activation of said stopping device for braking the motion of said lug according to a predetermined desired velocity as a function of the position of said stop element.

18. The mechanism of claim 17, said output of said light monitor corresponding to the position of said lug, and said governor comprising a differentiator for converting the output from the light monitor into a voltage proportional to the speed of the lug and a voltage-current transformer for converting this speed-proportional voltage into a desired current for exciting said electromagnetic coil for braking said stop element to produce said desired velocity function of said stop element.

19. The mechanism of claim 16, said operating means comprising said stop element having a permanent magnet attached at the end opposite from said driving element, means for sensing the motion fo said permanent magnet comprising a stationary coil with an open yoke within which said permanent magnet moves, and means for outputting a signal corresponding to said motion of said permanent magnet, and a governor for converting said output of said sensing means for outputting a control signal for controlling the activation of said stopping device for braking the motion of said lug according to a predetermined desired velocity as a function of the position of said stop element.

20. The mechanism of claim 19, said output of said means for sensing the motion of said permanent magnet comprising a voltage signal that is proportional to the speed of said permanent magnet, and said governor comprising a voltage-current transformer for converting said voltage signal into a current for activating said electromagnet for braking said stop element to a predetermined desired velocity that is a function of the position of said stop element.

* * * * *

UNITED STATES PATENT AND TRADEMARK OFFICE
CERTIFICATE OF CORRECTION

PATENT NO. : 4,311,373
DATED : January 19, 1982
INVENTOR(S) : Gerhard Kranz

It is certified that error appears in the above—identified patent and that said Letters Patent is hereby corrected as shown below:

Front Page, (75) Inventor, "Brunswick" should read
-- Braunschweig --;
Front Page, (73) Assignee, "Brunswick" should read
-- Braunschweig --;
Front Page, (57) ABSTRACT, line 12, "was" should read -- has --;

Column 2, line 27, delete "in", first occurrence.

Column 3, line 21, "in" should read -- is --;

Column 7, line 10, "aramture" should read -- armature --;

Column 8, line 13, "$\gamma$" should read -- $\alpha$ --;

Column 8, line 15, "$\gamma$" should read -- $\alpha$ --;

Column 9, line 57, "adequate" should read -- adequately --;

Column 11, line 42, "designed" should read -- dispensed --;

Column 14, line 39, "fo" should read -- of --.

Signed and Sealed this

Sixth Day of July 1982

[SEAL]

Attest:

GERALD J. MOSSINGHOFF

Attesting Officer     Commissioner of Patents and Trademarks